US006738392B1

United States Patent
Thurston

(10) Patent No.: US 6,738,392 B1
(45) Date of Patent: May 18, 2004

(54) METHOD AND APPARATUS OF FRAMING HIGH-SPEED SIGNALS

(75) Inventor: Andrew J. Thurston, Allen, TX (US)

(73) Assignee: Cisco Technology, Inc., San Jose, CA (US)

(*) Notice: Subject to any disclaimer, the term of this patent is extended or adjusted under 35 U.S.C. 154(b) by 739 days.

(21) Appl. No.: 09/671,965

(22) Filed: Sep. 27, 2000

(51) Int. Cl.$^7$ ................ H04L 7/08; H04J 3/06
(52) U.S. Cl. .......... 370/503; 370/509; 370/514; 370/539; 370/541
(58) Field of Search ................ 370/465, 466, 370/474, 476, 503, 509–511, 512, 535, 539, 541, 514, 513

(56) References Cited

U.S. PATENT DOCUMENTS

| | | | | |
|---|---|---|---|---|
| 5,872,780 A | * | 2/1999 | Demiray et al. | 370/359 |
| 6,359,908 B1 | * | 3/2002 | Soda | 370/503 |
| 6,493,359 B1 | * | 12/2002 | Sorgi et al. | 370/506 |
| 6,658,021 B1 | * | 12/2003 | Bromley et al. | 370/466 |
| 6,674,771 B1 | * | 1/2004 | Taniguchi | 370/505 |

* cited by examiner

Primary Examiner—Ajit Patel
(74) Attorney, Agent, or Firm—Campbell Stephenson Ascolese, LLP

(57) ABSTRACT

A method for high-speed signal framing of an incoming bit stream includes receiving the incoming bit stream in a datapath and locating a predetermined framing pattern in the datapath by finding a predetermined number of repetitions of a first portion of the framing pattern, bit aligning the bits in the datapath based on the predetermined number of repetitions of the first portion, priority encoding bits in a next cycle of the datapath, identifying a location of a second portion of the framing pattern, word aligning the priority encoded bits. The method includes declaring the bit stream as in frame. The incoming bit stream is over a datapath of at least 64 bits and the predetermined number of repetitions is at least three repetitions. Further, the incoming bitstream is a parallelized bitstream, the parallelization being performed in a shift register. An apparatus disposed in a communication system includes a shift register to receive an incoming bitstream that is configured to parallelize the incoming bitstream, a bit-aligning multiplexer coupled to the shift register that bit-aligns the parallelized bitstream according to a first portion of a framing pattern, a priority encoder coupled to the bit-aligning multiplexer that locates a priority byte in the parallelized bitstream identified in a second portion of the framing pattern and identifies a transition between the first portion and the second portion of the framing pattern, a byte-aligning multiplexer coupled to the priority encoder that byte-aligns the parallelized bitstream according to the priority byte and determining frame borders of the incoming bitstream.

29 Claims, 11 Drawing Sheets

METHOD AND APPARATUS OF FRAMING HIGH-SPEED SIGNALS

BACKGROUND OF THE INVENTION

1. Field of the Invention

The present invention relates to data communications, and, more particularly, efficiency in data communication circuits.

2. Description of the Related Art

A data communications network is the interconnection of two or more communicating entities (i.e., data sources and/or sinks) over one or more data links.

A data communications network allows communication between multiple communicating entities over one or more data communications links. High bandwidth applications supported by these networks include streaming video, streaming audio, and large aggregations of voice traffic. In the future, these demands are certain to increase. To meet such demands, an increasingly popular alternative is the use of lightwave communications carried over fiber optic cables. The use of lightwave communications provides several benefits, including high bandwidth, ease of installation, and capacity for future growth.

The synchronous optical network (SONET) protocol is one among those protocols designed to employ an optical infrastructure and is widely employed in voice and data communications networks. SONET is a physical transmission vehicle capable of transmission speeds in the multi-gigabit range, and is defined by a set of electrical as well as optical standards. A similar standard to SONET is the Synchronous Digital Hierarchy (SDH) which is the optical fiber standard predominantly used in Europe. There are only minor differences between the two standards. Accordingly, hereinafter any reference to the term SONET refers to both SDH and SONET networks, unless otherwise noted.

In some networks, network nodes store data which they use for proper operation. In SONET, data between adjacent nodes are transmitted in modules called STS's (synchronous transport signals). Each STS is transmitted on a link at regular time intervals (for example, 125 microseconds). See Bellcore Generic Requirements document GR-253-CORE (Issue 2, December 1995), hereinafter referred to as "SONET Specification," and incorporated herein by reference for all purposes.

SONET network equipment transmits the STS frames in various paths termed Line, Section, and Path. Referring to FIG. 1A, SONET equipment is shown as depicting Section, Line and Path definitions. Path Terminating Equipment 10 is shown coupled to Line Terminating Equipment 20. Line Terminating Equipment 20 is coupled to Section Terminating Equipment 30. In general, the network equipment shown in FIG. 1A includes fiber optic equipment that interfaces with other types of transmission equipment.

When transported, the signals are broken into layers: Physical, Section, Line and Path. The layers are hierarchical in nature, with each layer performing a different function. The Physical layer addresses the transport of bits across the physical medium. Accordingly, no overhead is associated with the physical layer. The equipment associated with the Physical layer converts STS-N signals into optical or electrical SONET signals. The Section layer addresses the transport of STS-N frames across the physical medium. The equipment associated with this layer functions to perform framing, scrambling, error monitoring and section-level overhead. Section Terminating equipment 30 interprets, modifies and creates section overhead. The Line layer addresses transport of Path level payloads. The Line layer further synchronizes and multiplexes functions for the Path layer. Line layer overhead functions to maintain and protect. The overhead is interpreted, modified and created by Line Terminating Equipment 20. The Path layer addresses transporting payloads between SONET terminal multiplexing equipment. The Path layer maps payloads into formats required by the Line layer. The Path layer communicates 'end-to-end with the Path overhead with Path Terminating Equipment 10. Generally, network equipment that contains Path Terminating equipment also contains Section and Line Terminating equipment.

Referring to the Section Overhead, the SONET Specification provides that the section overhead bytes A1 and A2 are allocated in each STS-1 for framing. Specifically, the Specification provides that the A1 byte is set to '11110110' and the A2 byte is set to '00101000' in all STS-1s in an STS-N. Framing is accomplished by network equipment finding the transition between the A1 and A2 bytes. Thus, finding the transition provides the second byte position, and finding the second byte position provides enough data to frame an entire SONET STS-1 frame, thereby aligning the data as it passes downstream.

A problem with the current SONET/SDH rules for framing is that newer SONET STS frames have grown larger with newer technology. Following the SONET Specification, framing requires receiving 192 bytes of an A1 byte and 192 bytes of an A2 byte for a OC-192 frame. There are several problems associated with the method provided in the Specification. Among those problems, there is a probability that the bytes found by a framer are not A1 or A2 bytes, because the probability of false framing increases in proportion to the number of bits considered. Further, the increased time necessary for determining frames using the method defined in the Specification is inefficient. What is needed is an efficient system and method for framing high-speed signals.

SUMMARY OF THE INVENTION

Accordingly, a method for framing an incoming bit stream provides high-speed signal framing. The method includes receiving the incoming bit stream in a datapath and locating a predetermined framing pattern in the datapath. More specifically, the locating includes finding a predetermined number of repetitions of a first portion of the framing pattern, bit aligning the bits in the datapath based on the predetermined number of repetitions of the first portion, priority encoding bits in a next cycle of the datapath, identifying a location of a second portion of the framing pattern, word aligning the priority encoded bits. The method continues with declaring the bit stream as in frame.

According to an embodiment, the incoming bit stream is over a datapath of at least 64 bits and the predetermined number of repetitions is at least three repetitions. Further, in the embodiment, the incoming bitstream is a parallelized bitstream, the parallelization being performed in a shift register.

In one embodiment, the incoming bitstream is a synchronous transport signal (STS) having N modules (STS-N). N is variable and in one embodiment N is 192.

Another embodiment is directed to an apparatus disposed in a communication system. The apparatus includes a shift register to receive an incoming bitstream that is configured to parallelize the incoming bitstream. The apparatus further includes a bit-aligning multiplexer coupled to the shift register, the bit-aligning multiplexer bit-aligning the parallelized bitstream according to a first portion of a framing pattern. The apparatus further includes a priority encoder coupled to the bit-aligning multiplexer, the priority encoder locating a priority byte in the parallelized bitstream identified in a second portion of the framing pattern. The priority encoder further identifies a transition between the first portion and the second portion of the framing pattern. The apparatus further includes a byte-aligning multiplexer coupled to the priority encoder, the byte-aligning multiplexer byte-aligning the parallelized bitstream according to the priority byte, the byte-aligning determining frame borders of the incoming bitstream.

According to an embodiment, the bit-aligning multiplexer bit aligns three repetitions of the first portion of the framing pattern. Further, the priority encoder includes eight comparators coupled to a multiplexer. In one embodiment, the apparatus is disposed on an application specific integrated circuit (ASIC) coupled to a line card, the line card being one of a plurality of line cards disposed in a management bay holding one or more line cards configured to transmit a plurality of signals Another embodiment of the invention is directed to a computer program product for communication. The computer program product includes signal bearing media bearing programming adapted to locate a predetermined framing pattern with the bits in an incoming datapath, find a predetermined number of repetitions of a first portion of the framing pattern, bit align the bits in the datapath based on the predetermined number of repetitions of the first portion, priority encode bits in a next cycle of the datapath, identify a location of a second portion of the framing pattern, word align the priority encoded bits, and declare the aligned datapath as in frame. The predetermined number of repetitions is three in one embodiment.

Another embodiment is directed to a communication system including means for locating a predetermined framing pattern with the bits in an incoming datapath, the means for locating including: means for finding a predetermined number of repetitions of a first portion of the framing pattern, means for bit aligning the bits in the datapath based on the predetermined number of repetitions of the first portion, means for priority encoding bits in a next cycle of the datapath, means for identifying a location of the second portion of the framing pattern, and means for word aligning the priority encoded bits. The method further includes means for declaring the bit stream as in frame.

BRIEF DESCRIPTION OF THE DRAWINGS

The present invention may be better understood, and its numerous objects, features, and advantages made apparent to those skilled in the art by referencing the accompanying drawings.

FIG. 8 illustrates cycles for framing a datapath in accordance with an embodiment of the present invention.

The use of the same reference symbols in different drawings indicates identical items unless otherwise indicated.

DETAILED DESCRIPTION OF THE INVENTION

The following is intended to provide a detailed description of an example of the invention and should not be taken to be limiting of the invention itself. Rather, any number of variations may fall within the scope of the invention that is defined in the claims following the description.

In addition, the division of the detailed description into separate sections is merely done as an aid to understanding and is in no way intended to be limiting.

An Exemplary Network Element

Figure 1A:
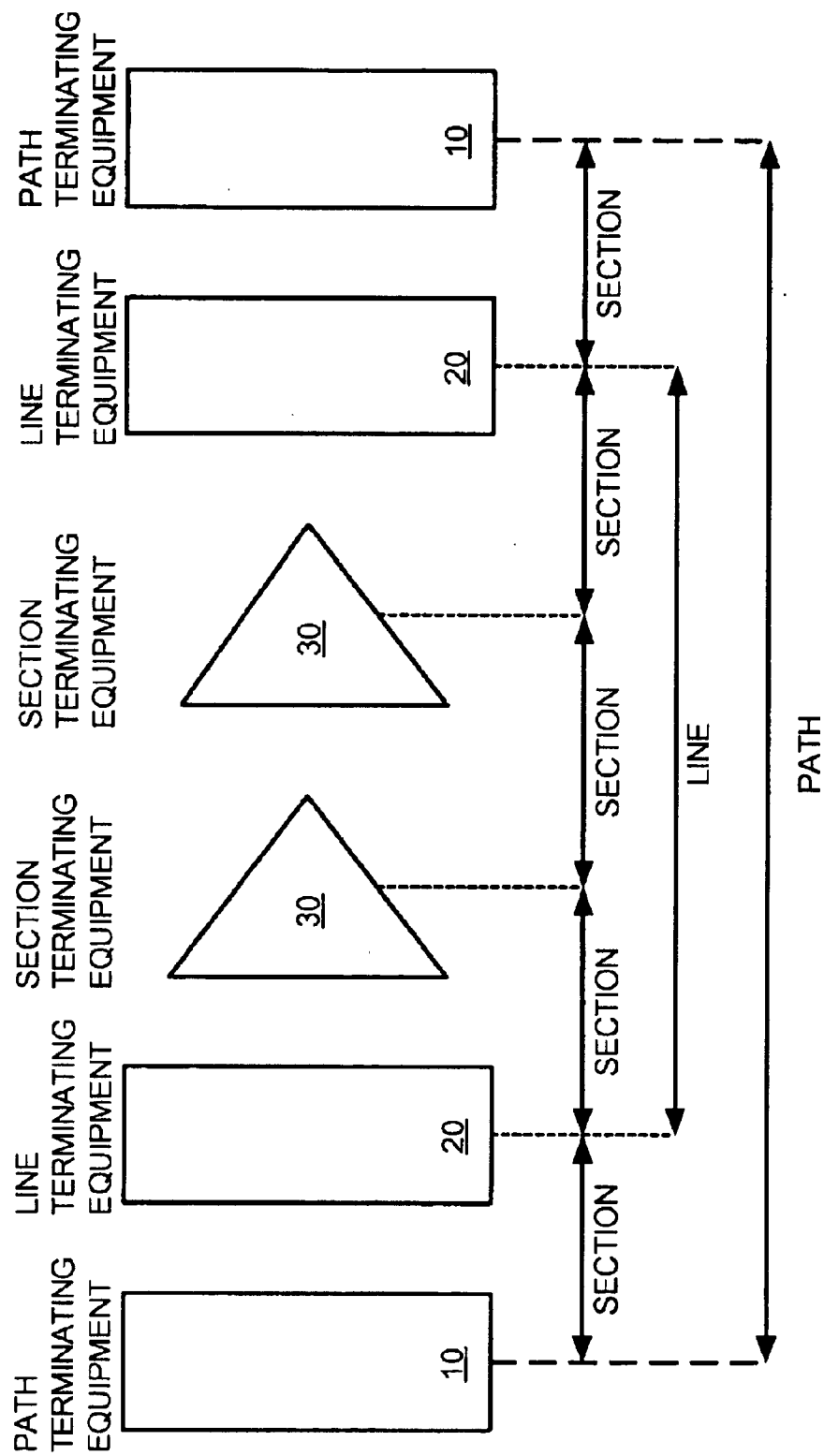
FIG. 1A is a network configuration in accordance with the SONET Specification.
Figure 1B:
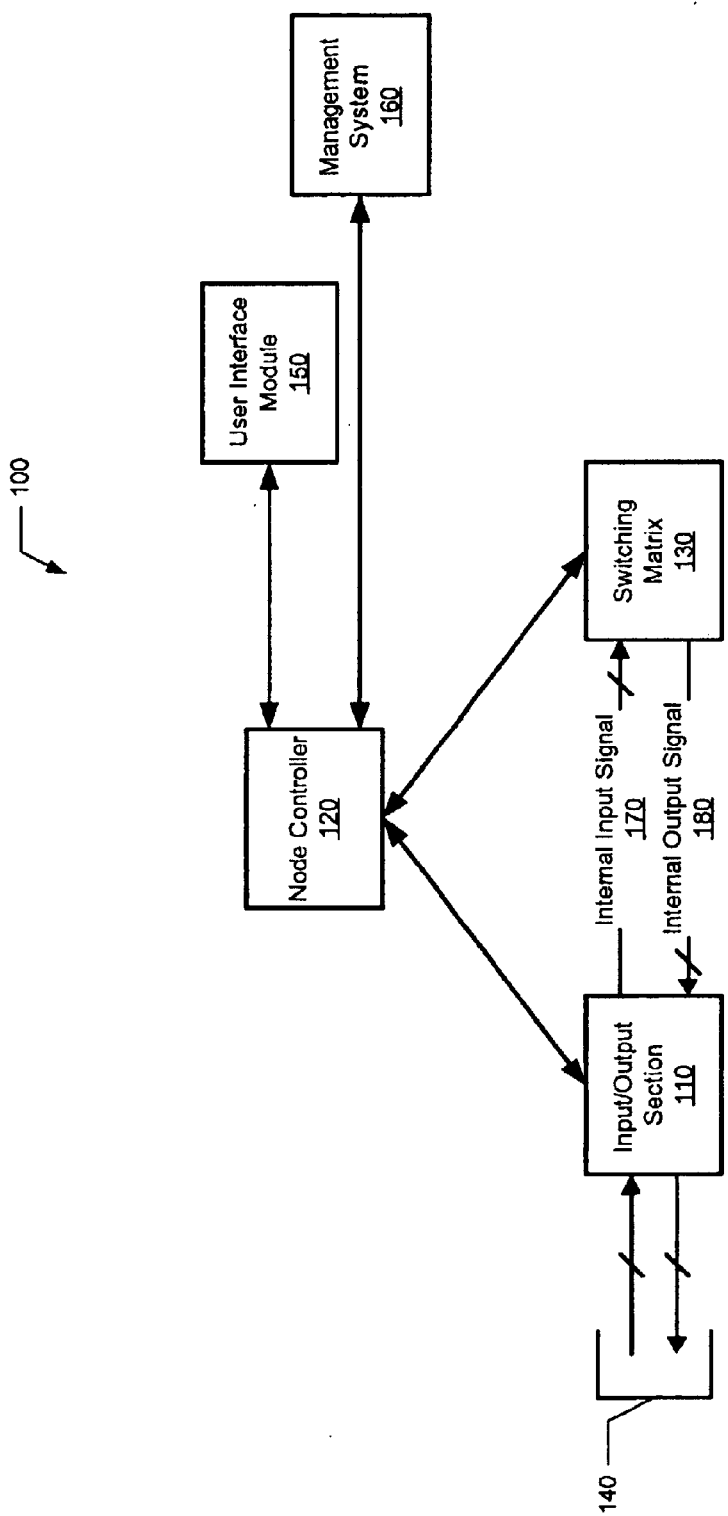
FIG. 1B is a block diagram of an exemplary router.

FIG. 1B illustrates a router 100. Router 100 includes an input/output section 110, a node controller 120, and a switching matrix 130. Node controller 120 contains, for example, real time software and intelligent routing protocols (not shown). Router 100 supports interfaces including, but not limited to, optical signal interfaces (e.g., SONET), a user interface module 150, and a management system 160. Internal input signals 170 and internal output signals 180 may be electrical or optical in nature.

Figure 1C:
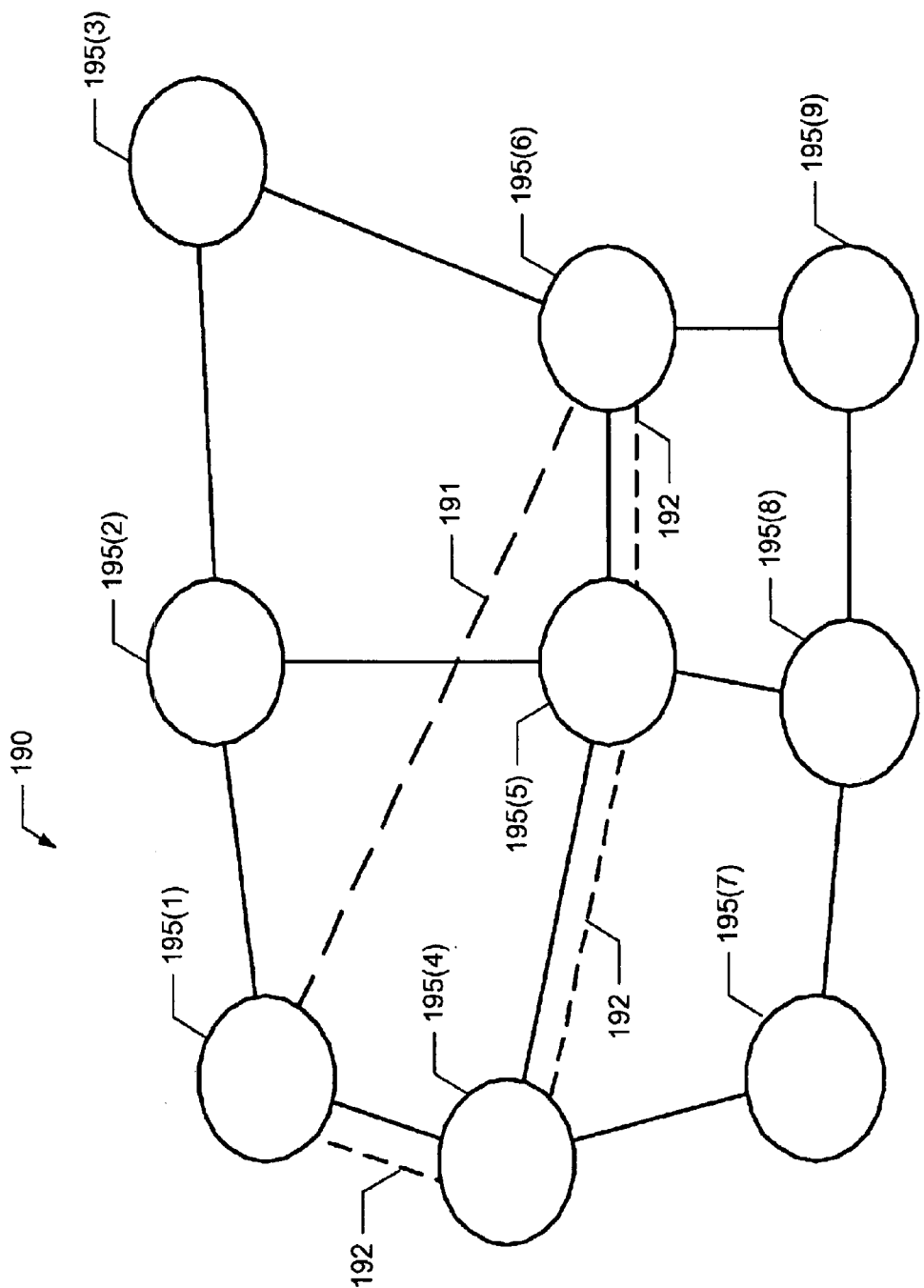
FIG. 1C is a block diagram of a network including a number of the routers of FIG. 1B.

FIG. 1C illustrates a network 190 that includes a number of nodes, network nodes 195(1)–(N). One or more of network nodes 195(1)–(N) can be a router such as router 100. Network 190 can thus support the automatic provisioning, testing, restoration, and termination of virtual paths (exemplified by a virtual path 191) over a physical path (exemplified by a physical path 192) from one of network nodes 195(1)–(N) to another of network nodes 195(1)–(N).

In one embodiment, there are at least three types of processors in a router 100.

The lowest level, level-3, resides on the line card and is responsible for all real time aspects of the processing of the physical protocol (e.g., SONET). In a SONET implementation, every level-3 processor is responsible for a single optical signal (e.g., an OC48 signal) and, via a protocol processor, performs all required SONET/SDH section and line termination functions. The fast response time required from the level-3 processor makes a firmware implementation preferable. The firmware, which may be written in the "C" or "C++" programming languages, assembler, or other programming language, is preferably optimized for low latency and resource efficiency. Higher-level processing is implemented on a separate module, the shelf processor module, which is shared by several line cards.

The second level of processors, i.e., level-2, reside on a shelf and main matrix processor modules. The software on the shelf processor module is responsible for managing and controlling line cards. Only half the line cards supported are active at any one time in order to support 1+1 protection. A level-2 processor deals with tasks that require a reasonable response time (for example, on the order of milliseconds), but have no direct impact on the datapath. In other words, missed events, such as hardware interrupts, do not result in bit errors. Some of the functions handled by the shelf processor include the periodic collection of maintenance data from the line cards, receiving and processing periodic keep-alive messages from those cards, shelf startup and configuration, proxy management, and other related functions.

The third processor level, level-1, resides on a system processor module and provides system-wide management and control services. In one embodiment, there are preferably two fully synchronous copies of the level-1 processor in the system, both of which are simultaneously active and, through a dedicated and redundant high-speed link, keep their run-time and stored databases filly synchronized. One of the two processors is designated the master and is responsible for all level-1 processing. An update message is sent to the second processor whenever a change is made to the database and before that change is effected. A periodic keep-alive mechanism allows either copy of the system controller to detect failures on the other copy.

Router 100 provides yet another type of processor, referred to herein as a route processor. Such a processor is dedicated to the path/route discovery and restoration functions. The route processor is responsible for receiving failure indications from the line cards, calculating a new route for failed connections, and sending reconfiguration requests to all affected nodes, including its own.

Hardware Architecture

In one embodiment, router 100 can be used, for example, as SONET/SDH line terminating equipment (LTE) capable of terminating the Section and Line overheads of received OC-48 signals, and cross-connects those signals according to provisioned input-output mappings. Some of the terminated signals can optionally be protected using any of the common protection schemes (1+1, 1:1, and 1:N). Overhead processing and generation is performed on the line card by a protocol processor. This protocol processor handles all aspects of the SONET protocol, including framing, insertion and extraction of embedded data channels, error checking, AIS detection, pointer processing, clock recovery, multiplexing/duplexing, and similar duties.

Signal Path

Figure 2:
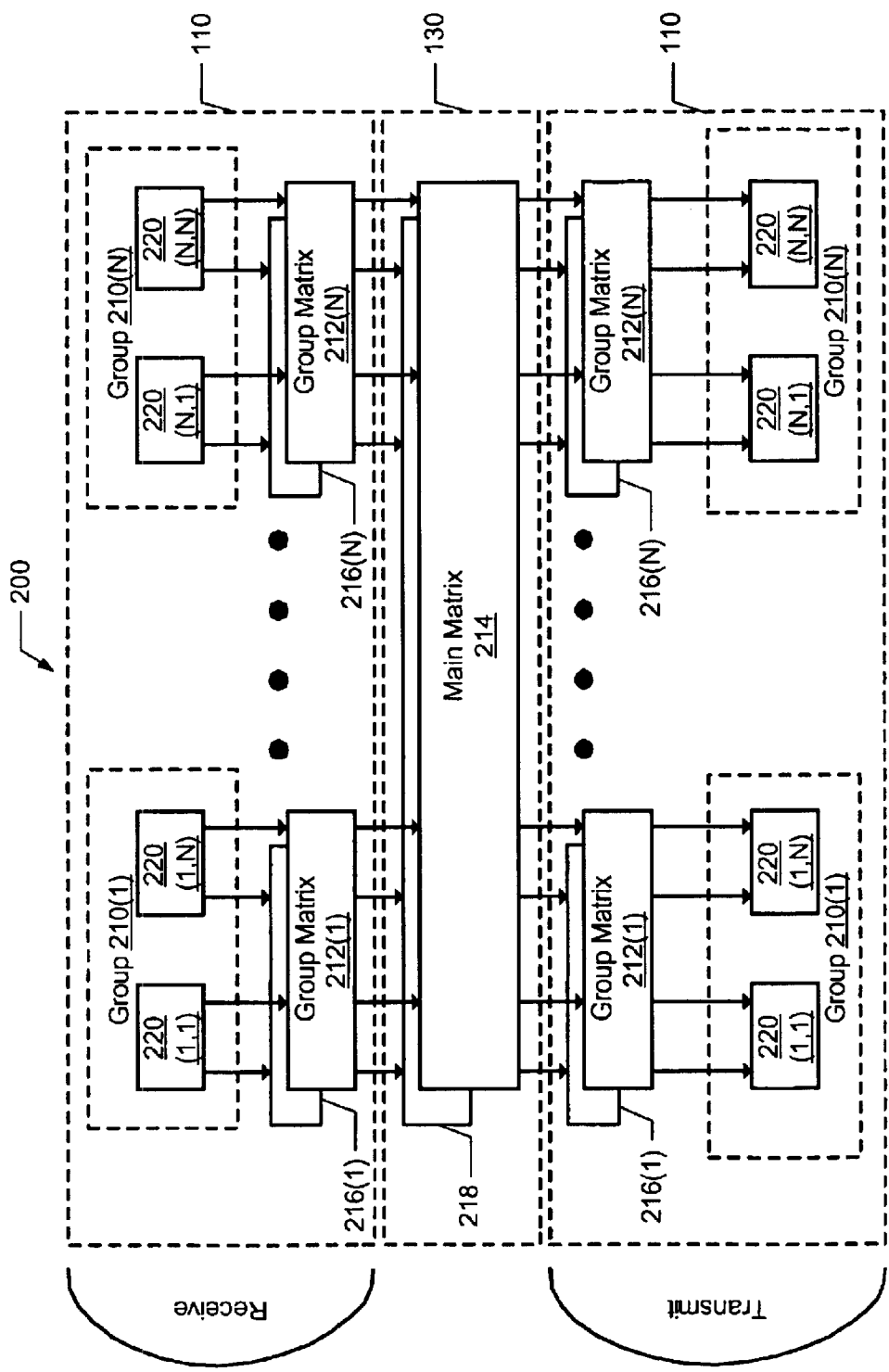
FIG. 2 is a block diagram of the signal paths and functional blocks of the router of FIG. 1B.

FIG. 2 is a block diagram of signal paths 200 within router 100. The primary signal paths in router 100 include one or more groups exemplified by groups 210(1)–(N), group matrices 212(1)–(N), and a main matrix 214. As depicted in FIG. 1A, groups 210(1)–(N), and group matrices 212(1)–(N) are shown as having receive and transmit sections. Groups 210(1)–(N) each include line cards 220(1,1)–(1,N), through line cards 220(N,1)–(N,N). Signals from line cards 220(1, 1)–(N,N) are sent to the corresponding group matrix. In one embodiment, two sets of the group matrix cards, group matrices 212(1)–(N) and 216(1)–(N) are employed. Main matrix 214 is also mirrored in one embodiment by a redundant copy, a backup main matrix 218, which together form switching matrix 130. As shown in FIG. 2, the redundancy for group matrices 212(1)–(N) (i.e., group matrices 216(1)–(N)), is also provided on the transmit side.

It will be noted that the variable identifier "N" is used in several instances in FIG. 2 (and subsequent use of other variables, such as "m," "x," "k," and others) to more simply designate the final element (e.g., group matrix 212(N), line card 220(N,N), and so on) of a series of related or similar elements (e.g., group matrices 212(1)–(N), line cards 220 (1,1)–(N,N), and so on). The repeated use of such variable identifiers is not meant to imply a correlation between the sizes of such series of elements. The use of such variable identifiers does not require that each series of elements have the same number of elements as another series delimited by the same variable identifier. Rather, in each instance of use, the variable identified by "N" (or "m," "x," "k," and others) may hold the same or a different value than other instances of the same variable identifier. For example, group matrix 212(N) may be the tenth group matrix in a series of group matrices, whereas line card 220(N,N) may be the forty-eighth line card in a series of line cards.

Using signal paths 200 as an example, data enters the system at one of line cards 220(1,1)–(N,N). It is at this point, in a SONET-based system, that the Section and Line overheads are processed and stripped off by a protocol processor (not shown). The extracted SONET/SDH payload envelope is then synchronized with the system clock and sent to two different copies of a local matrix, depicted as group matrices 212(1)–(N) and 216(1)–(N) in FIG. 1A. In one embodiment, group matrices 212(1)–(N) and 216(1)–(N) are used mainly as 2:1 reduction stages that select one of two optical signals and pass the selected optical signal to switching matrix 130. This allows the implementation of a variety of protection schemes (including 1:N, or 0:1) without having to use any additional ports on main matrix 214. All protect signals are terminated at group matrices 212(1)–(N) and 216(1)–(N). In order to maximize bandwidth, it is preferable that only active signals be passed through to switching matrix 130.

In one embodiment, switching matrix 130 is an errorless, rearrangeably non-blocking switching network. In one embodiment, switching matrix 130 is a 256×256 switching network that consists of three columns and 16 rows of 16×16 switching elements that allow any of their inputs to be connected to any of their outputs. A single copy of the matrix may be housed, for example, in a single rack that contains three shelves, one for each column (or stage) of the matrix. Each one of such shelves contains cards housing the 16 switching elements in each stage. The switching element itself includes, for example, a 16×16 crosspoint switch, with optical transceivers, and a microcontroller for controlling the crosspoint switch and providing operational feedback to the level-2 processor. Communications between the two processors may be carried, for example, over an Ethernet connection. The level-2 processor in turn communicates with the level-1 and route processors.

The switching elements in each matrix copy of the exemplary embodiment may be connected using fiber-optic cables, for example. While copper cabling may also be employed, such an option may not offer the speed and number of connections provided by an optical arrangement. After passing through the stages of switching matrix 130, an optical signal may be routed to an I/O shelf that (optionally) splits the optical signal into two signals. One of the signals is sent to an active line card, while the other, when available, is sent to a backup card.

Line cards 220(1,1)–(N,N) receive optical signals from group matrices 212(1)–(N) and 216 (1)–(N) which are in turn connected to two separate copies of the main matrix. Line cards 220(1,1)–(N,N) monitor both signals for errors and, after a user-defined integration period, switch to the backup signal if that signal exhibits better bit error rate (BER) performance than the prior active signal. This scheme, referred to herein as 1-plus-1, allows line cards 220(1,1)–(N,N) to select between the two copies of the group matrix without any level-1 or level-2 CPU intervention. This helps to ensure that such a switch can be made in 50 ms or less (per Bellcore's recommendations in the SONET Specification. The selected signal is then processed by the transmit section of the protocol processor, which inserts all required transport overhead bytes into the outgoing stream.

Regarding the signals described herein, both above and subsequently, those skilled in the art will recognize that a signal may be directly transmitted from a first logic block to a second logic block, or a signal may be modified (e.g., amplified, attenuated, delayed, latched, buffered, inverted, filtered or otherwise converted, etc.) between the logic blocks. Although the signals of the embodiments described herein are characterized as transmitted from one block to the next, other embodiments may include modified signals in place of such directly transmitted signals with the informational and/or functional aspect of the signal being transmitted between blocks. To some extent, a signal input at a second logic block may be conceptualized as a second signal derived from a first signal output from a first logic block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not substantively change the informational and/or final functional aspect of the first signal.

Control Path

Figure 3:
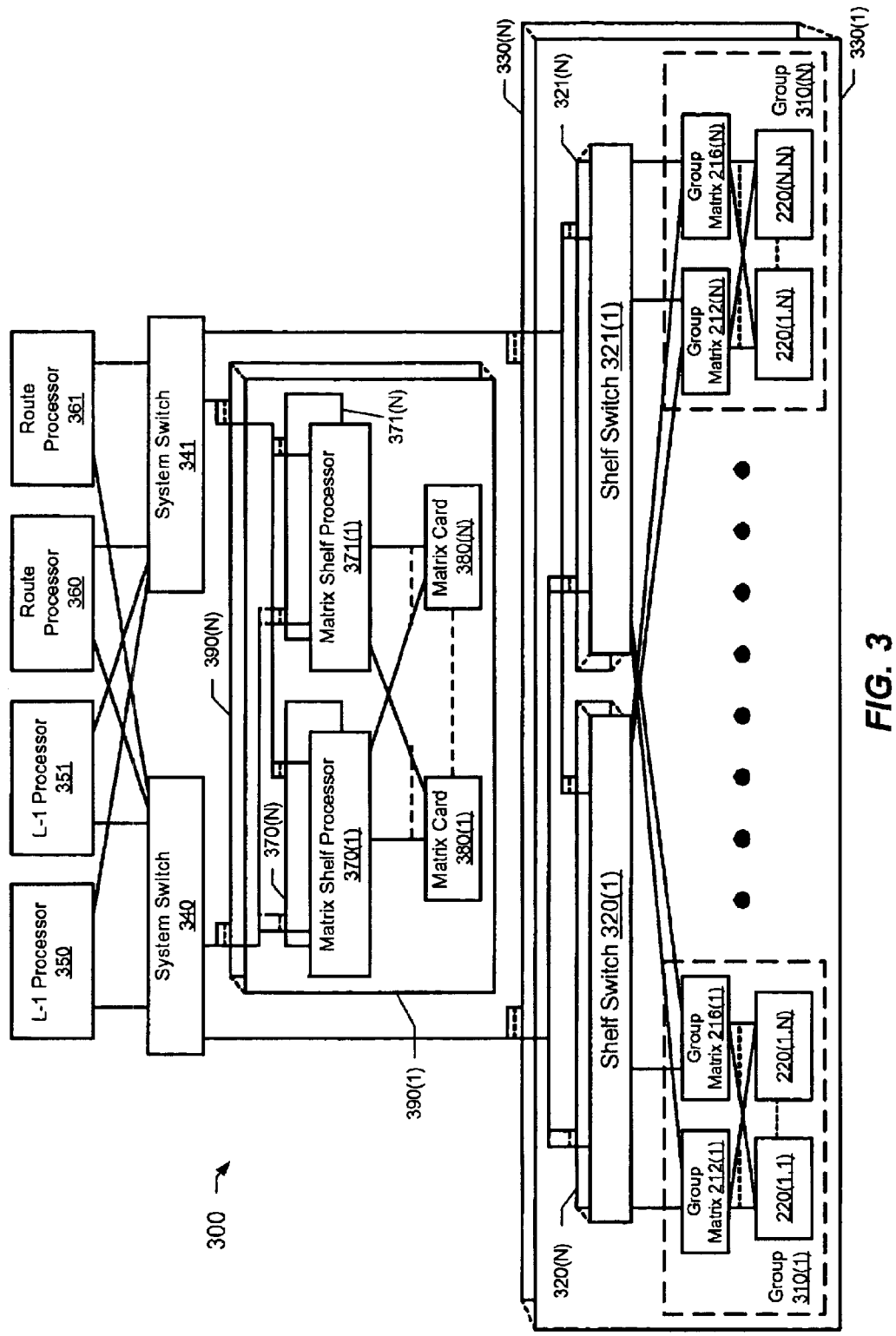
FIG. 3 is a block diagram of the control paths of the router of FIG. 1B.

FIG. 3 illustrates a control path 300 of a router, such as router 100. Control path 300 includes all non-payload-related flows within the system and the hardware and software necessary for the control of the signal paths illustrated in FIG. 2. All major control flows are carried over an internal local area network (LAN), which is, for example, a collection of switched Ethernet segments. The structure of the internal LAN is hierarchical and can be created using a mixture of 10 Mbps and 100 Mbps Ethernet segments, for example. Higher-speed segments (e.g., gigabit Ethernet) can be used as well.

Groups

At the bottom of the hierarchy is what is referred to herein as a group matrix, or a Group Ethernet Repeater in a system using Ethernet communications, and depicted in FIG. 3 as group matrices 212(1)–(N) and 216(1)–(N). Each one of group matrices 212(1)–(N) and 216(1)–(N), also referred to herein as a hub, a repeater, or concentrator, is a physical layer device and preferably supports a star network topology, such as the IEEE 802.3 10BASE-T networking standard. The redundant connections from line cards 220(1, 1)–(N,N) in each of groups 310(1)–(N) are connected to two repeaters that reside on two separate copies of the group matrix module. Preferably, each one of line cards 220(1,1)–(N,N) supports two network ports (e.g., 10BASE-T Ethernet ports). The two sets of four signals from each port pass through a relay that selects one of them for connection to the LAN for purposes of redundancy. Groups 310(1)–(N) represent the first layer of the control bus hierarchy. Group matrices 212(1)–(N) and 216(1)–(N) are each controlled by a shelf processor (not shown, for the sake of clarity) and communicate with one of the shelf switches described below via LAN connections.

Shelf Ethernet Switch

FIG. 3 also illustrates certain features of router 100 pertaining to the relationship between shelf switches 320(1)–(N) and 321(1)–(N), and groups 310(1)–(N). Groups 310(1)–(N) are again shown, with regard to the control functions thereof. In this depiction of groups 310(1)–(N), line cards 220(1,1)–(N,N) are shown as being attached to networking devices, indicated here as group matrices. Group matrices 212(1)–(N) and 216(1)–(N) may be, for example, multi-port Ethernet hubs running at 10 Mbps. Each of line cards 220(1,1)–(N,N) feed signals into two of group matrices 212(1)–(N) and 216(1)–(N). For example, line card 220(1,1) feeds received information to group matrices 212(1) and 216(1). Group matrices 212(1)–(N) and 216(1)–(N) each feed a signal into shelf switches 320(1)–(N) and 321(1)–(N) of FIG. 2. Shelf switches 320(1)–(N) and 321(1)–(N) are each controlled by a shelf processor (not shown for the sake of clarity) and communicate with one of the system switches (not shown, for the sake of clarity). Shelf switches 320(1)–(N) and 321(1)–(N) are the next higher level of the control hierarchy in router 100, and are located on the shelf processor module (exemplified by line racks (330(1)–(N)). Each copy of shelf switches 320 (1)–(N) and 321(1)–(N) interconnects six connections from the three groups in each shelf, another connection from the shelf processor, and one connection from system switch 340 (and 341). Shelf switches 320(1)–(N) and 321(1)–(N) can be implemented, for example, using an 8-port Ethernet configured to handle 10 Mbps Ethernet traffic and a single-port, dual-rate switch (e.g., 10 Mbps/100 Mbps Ethernet).

System Switch

The next level of the hierarchy is the system switch, of which there are two copies in each router. These are shown as system switches 340 and 341 in FIG. 3. This fully redundant scheme prevents failures on one switch from taking down the entire control bus. In one embodiment, a system switch manages connections from the following sources:

1. High-speed connection(s) from shelf switches 320(1)–(N) and 321(1)–(N);
2. High-speed connection(s) to higher-level processors (e.g., redundant level-1 processors 350 and 351, and redundant route processors 360 and 361); and
3. High-speed connection(s) to matrix shelf processors 370(1)–(N) and 371(1)–(N) which, in turn, control matrix cards 380(1,1)–(1,N)), located in main matrix racks 390(1)–(N).

It will be noted that main matrix 214 includes matrix cards 380(1,1)–(1,N), and that, more generally, main matrices 214 and 218 are included matrix racks 390(1)–(N).

System switches 340 and 341 are located in a management bay. As noted, the fully redundant switches manage connections from various router elements, such as I/O and matrix bays, level-1 processors, and route processors. Each of level-1 processors 350 and 351 and route processors 360 and 361 is preferably connected to system switches 340 and 341 using 100 Mbps Ethernet connections in a configuration that creates an expandable, efficient, and fully redundant control bus.

PHYSICAL CONFIGURATIONS AND MODULES

Line Card

Figure 4:
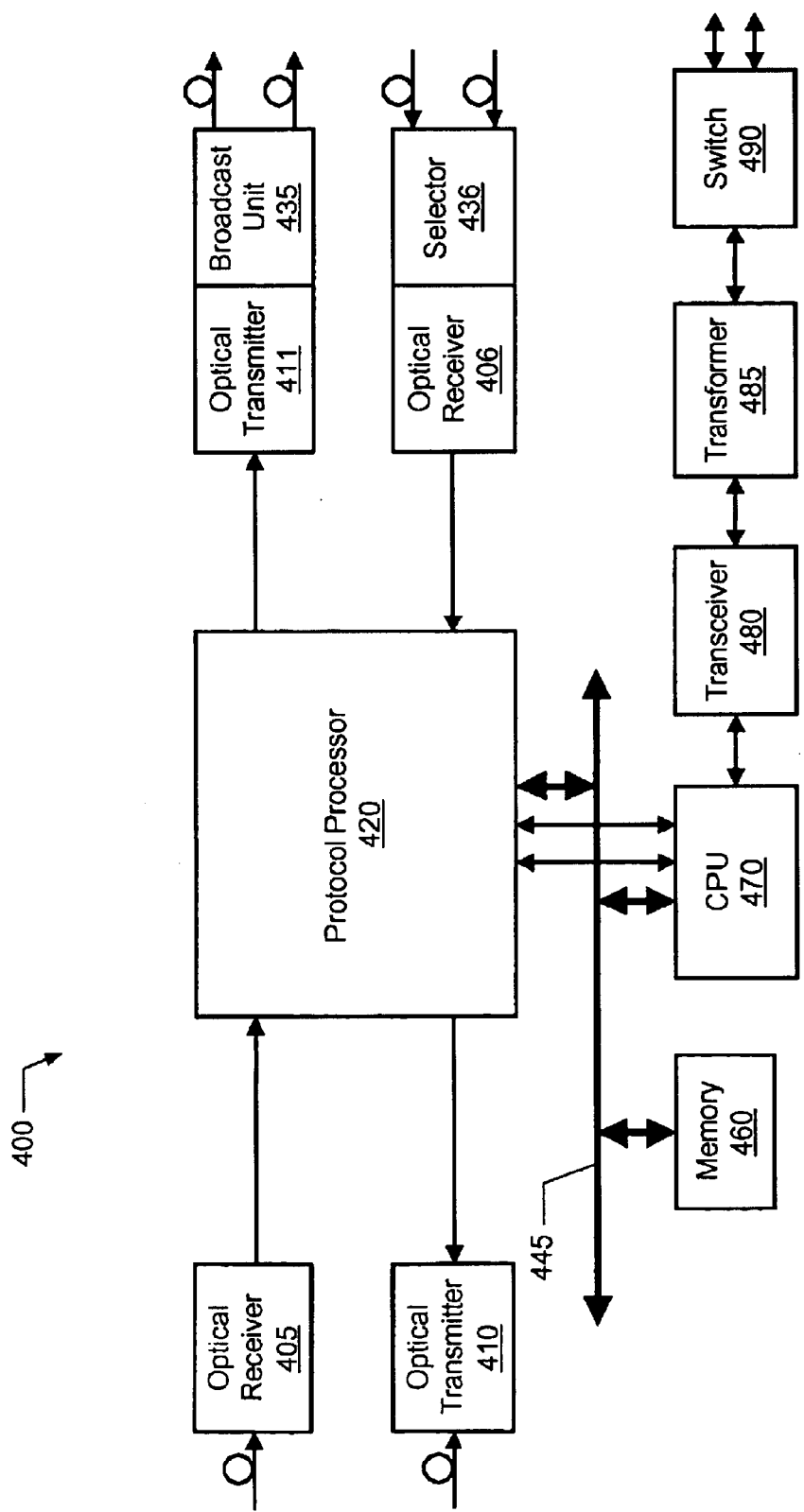
FIG. 4 illustrates the major components of one of the line cards.

FIG. 4 illustrates the major components of one of line cards 220(1,1)–(N,N), exemplified in FIG. 4 by a line card 400. A line card integrates all the necessary hardware and software functions to properly terminate the physical layer. In a SONET implementation, a line card terminates the transport overhead (Section+Line) of a full duplex OC-48 signal. Other components on this card provide a redundant optical connection to the switch matrix, and a communication channel to other modules in the system.

Line card 400 receives optical signals from other network elements via a line-side optical receiver 405 and from the local router's system via a system-side optical receiver 406. Each of these receivers implements an optical-to-electrical (O/E) conversion function. Line card 400 transmits optical signals to other network elements using a line-side optical transmitter 410 and to the group matrices using a system-side optical transmitter 411. Each of these transmitters implements an electrical-to-optical (E/O) conversion function. It will be noted that line-side refers to the side of the line card coupled to other network elements and system-side refers to the side of the line card coupled to the group matrices.

Line-side optical receiver 405 is coupled to a protocol processor 420 that performs clock recovery multiplexing, demultiplexing, and SONET STE/LTE processing in both directions. Similarly, system-side optical receiver 406 is also coupled to protocol processor 420 to allow protocol processor 420 to receive optical signals. The processed electrical signals from protocol processor 420 are coupled to the transmitters 410 and 411. The clock recovery functions are combined with demultiplexers and multiplexers to support reception and transmission of the optical data, respectively. The multiplexers serialize output data generated in protocol processor 420 by performing parallel-to-serial conversion on the parallel data. In contrast, de-multiplexers are used in protocol processor 420 to perform serial-to-parallel conversion on received data.

In order to add protection channels, line-side optical transmitter 410 is also coupled to a 1:2 broadcast unit 435. To receive such optical signals, optical receiver 406 is also coupled to a 2:1 selector 436 in order to select the working channel before the optical signals leave the shelf and thus prevent the standby channel (also referred to herein as the protect channel) from using any bandwidth on switching matrix 130.

Protocol processor 420 is coupled to a bus 445. Protocol processor 420 interfaces the line card to two copies of the matrix in a 1+1 physical protocol. In a SONET implementation, protocol processor 420 provides both STE/LTE processing according to published industry standards. Also coupled to bus 445 are a memory 460 and a CPU 470. Memory 460 should be fast enough for efficient operation of CPU 470.

CPU 470 communicates with other of line cards 220(1, 1)–(N,N) over a control bus (not shown) using a transceiver 480 that is coupled to CPU 470. Transceiver 480, is coupled to a transformer 485 which is coupled to a switch 490. Switch 490 is coupled to the control bus. Switch 490 implements a 1:1 protection scheme for transceiver 480 and couples CPU 470 to two independent ports on the backplane (not shown). Each of the two ports connects to one copy of the hub of the group matrix. This allows the software on the line card to switch to the backup link when the software detects failures on the active link.

Preferably, CPU 470 includes numerous integrated peripherals including embedded SCC channels (e.g., in-band communications) and an Ethernet controller (for example, to support communications with other system modules). In one embodiment, CPU 470 provides an onboard communications processor module (not shown) that handles time-critical aspects of the protocols supported.

Hub

One or more hubs are also provided to support communication between the group matrices and system switches in router 100. In an Ethernet communications environment, the hub's functions are carried out primarily by repeater interface controllers (RICs). Each RIC integrates the functions of a repeater, clock and data recovery unit (CDR), Manchester encoder/decoder, and transceiver. Each RIC has a set of registers that convey status information and allow a number of configuration options to be specified by the user using, for example, a microcontroller.

System Switch

One embodiment of a system capable of interconnecting network segments in a switched configuration allows communications between shelf switches, higher-level (e.g., level-1) processors, and shelf-processors. In an Ethernet-based system, the system switch supports both 10 Mbps and 100 Mbps connections. The segments come from the shelf switching in the I/O shelf and the matrix switches, among others, and allow these elements to communicate.

Management Bay

The management bay can house, for example, the following modules:

1. Level-1 processors, or system controllers, and their associated storage devices;
2. Route processors;
3. Optional group and WAN cards;
4. System Ethernet switches; and
5. Synchronization modules.

All of the above modules are fully redundant and communicate with the rest of router 100 over redundant control buses. The placement of individual modules within the rack is not addressed in this document, since there are no architectural preferences, or restrictions, on such choices.

Level-1 Processor/System Controller

A system controller (also referred to herein as a level-1 processor) provides overall control of router 100. The system controller also communicates with the system switches. The system controller includes a bus such as an all-purpose bus (APB), which in turn provides access to several bus and communications controllers. Among the controllers interfaced to the APB is a bus bridge, a peripheral interface, and an I/O interface. The I/O interface may provide functionality such as 10 Mbps/100 Mbps Ethernet communications. The I/O interface also supports peripherals such as keyboards, mice, floppy drives, parallel ports, serial ports, and the like. The bus bridge allows communications between the system controller's processor and other devices. The peripheral interface allows communications with peripherals such as hard disks. The system controller performs various functions, such as communicating with the route processor (s) to determine how the matrix should be configured, managing the router's resources, and similar duties.

APB may also be connected to a dual-channel serial communication controller (SCC), for example, which can be used to communicate with one or more remote Operations Systems (OS) using, for example, the X.25 protocol. For more OS links and higher link speeds, the user can optionally install one or more WAN Interface Modules in the management bay. Such modules, which preferably handle all real-time aspects of the OS link, including layer-2 of the OSI stack, communicate with the system controller.

Main Matrix Bay

Switching matrix 130 is based on a rearrangeably non-blocking switching matrix and can consist, for example, of switch nodes arranged in a staged array. For example, switching matrix 130 configured as a 256×256 switching matrix consists of 48 nodes arranged in an array of 16 rows by 3 columns, with each column containing one stage. All 48 nodes in the switch matrix are substantially similar. Each node is preferably a crossbar device, such as a 16×16 crossbar device that allows any of its 16 inputs to be connected to any of its 16 outputs, regardless of the crossbar's current state.

SONET Frame

In some networks, network nodes store data which they use for proper operation. In SONET, data between adjacent nodes are transmitted in modules called STS's (synchronous transport signals). Each STS is transmitted on a link at regular time intervals (for example, 125 microseconds). See the SONET Specification.

An STS-1 is a defined as a specific sequence of 810 bytes (6480 bits) including overhead bytes and an envelope capacity for transporting payloads. An STS-N frame is a sequence of N×810 bytes wherein N is a predetermined number.

An STS-N is formed by byte-interleaving of STS-1 and STS-M modules, wherein M is less than N.

Referring to Table 1, a portion of a SONET STS-3c frame, 9 rows and 270 columns, shows the organization of a SONET OC-3c (concatenated) frame, according to the BellCore STS-3c standard for SONET, which is incorporated herein by reference. The frames are transmitted row by row, from top to bottom, column byte by byte, 8000 frames/sec.

figured at line boundaries. For example, an Add-Drop Multiplexer (ADM) receiving a SONET frame will interpret the line overhead bytes. These line overhead bytes will not be sent on through the network. Instead, the ADM generates new line overhead bytes for transport through the network. Unlike the line overhead and section overhead bytes, path overhead bytes are received and interpreted at the ends of a path. Accordingly, an ADM receiving a frame will neither remove nor reconfigure path overhead bytes. An STS-192 frame provides 192 times as many bytes as an STS-1 frame. An STS-1 frame includes 810 bytes and an STS-192 frame includes 155,520 bytes. Following the SONET Specification, framing requires receiving 192 bytes of an A1 byte and 192 bytes of an A2 byte for an STS-192 frame. More particularly, the SONET Specification provides that framing bytes A1 and A2 must be found, but not each occurrence of the A1 and A2 bytes. Further, the SONET Specification directs that a "framing pattern" be determined that includes the A1 and A2 bytes and that two occurrences of the framing pattern determine a state of being in frame. Further, four frames are required to declare that the incoming bitstream is out of frame. Accordingly, under the SONET Specification, wherein each frame takes 125 μsec., an out of frame (OOF) declaration requires 375 μsec.

TABLE 1

A Sample Portion of a SONET STS-3c Frame

<----------------------------------------------------------------------------------<----------270 Bytes------------------
<----------------------------9 Bytes----------------------------->|<1B>|<----------------260 Bytes --------------

| | | | | | | | | | | | |
|---|---|---|---|---|---|---|---|---|---|---|---|
| SOH | A1 | A1 | A1 | A2 | A2 | A2 | J0 | Z0 | Z0 | J1 | Synchronous Payload |
| | B1 | | | E1 | | | F1 | | | B3 | Envelope (SPE) |
| | D1 | | | D2 | | | D3 | | | C2 | (9 Bytes × 260 Bytes) |
| Point | H1 | H1 | H1 | H2 | H2 | H2 | H3 | H3 | H3 | G1 | |
| LOH | B2 | B2 | B2 | K1 | | | K2 | | | F2 | |
| | D4 | | | D5 | | | D6 | | | H4 | |
| | D7 | | | D8 | | | D9 | | | Z3 | |
| | D10 | | | D11 | | | D12 | | | Z4 | |
| | S1 | Z1 | Z1 | Z2 | Z2 | M1 | E2 | | | Z5 | |

NOTE:
(Section Overhead (SOH) (3 × 9 Bytes), + Pointer (1 × 9 Bytes), + Line Overhead (LOH) (5 × 9 Bytes), + Path Overhead (POH) (9 × 1 Bytes),) = Transport Overhead for OC-3c (STS-3c) Frames. The POH is the 10th Byte in each of the 9 rows (J1, B3, C2, G1, F2, H4, Z3, Z4, Z5).

The OC-3c designation indicates that the carrier is not multiplexed, but carries data from a single source. Thus, the data stream is from a single source at 155.52 Mbps with three OC-1 streams within an OC-3c stream interleaved by column. The interleaving of streams produce a frame 270 columns wide and 9 rows deep. An OC-3c stream produces more actual user data than an OC-3 stream due to the path overhead column being included inside an SPE once instead of three times as is the case for three independent OC-1 streams. Accordingly, as shown in $T_{ABLE}$ 1, 260 of the 270 columns within the frame are available for user data in OC-3c as compared to 258 columns available in OC-3. A similar protocol to OC-3c is provided for European systems in ITU G.783. Although the OC-3 standard is presented, one of ordinary skill in the art with the benefit of the disclosure herein appreciates that the embodiments herein described apply to other SONET and SDH standards.

As shown in Table 1, the first ten bytes of a SONET OC-3c frame constitute transport overhead, followed by 260 bytes of Synchronous Payload Envelope. The ten bytes of transport overhead include section overhead, line overhead and path overhead bytes. In general, certain bytes of the transport overhead only travel between each section, and are reconfigured at each section boundary. Other transport overhead bytes travel through section boundaries and are recon- There are several problems associated with the method provided in the SONET Specification. Among those problems, there is a probability that the bytes found by a framer are not A1 or A2 bytes, because the probability of false framing increases in proportion to the number of bits considered. Further, the increased time necessary for determining frames using the method defined in the Specification is inefficient. Particularly, a communication circuit with a larger datapath, such as a 128 bit (16 byte) datapath has a faster clock frequency than smaller datapath widths. Thus, an system and method is required for finding a SONET frame for the larger datapath.

Figure 5:
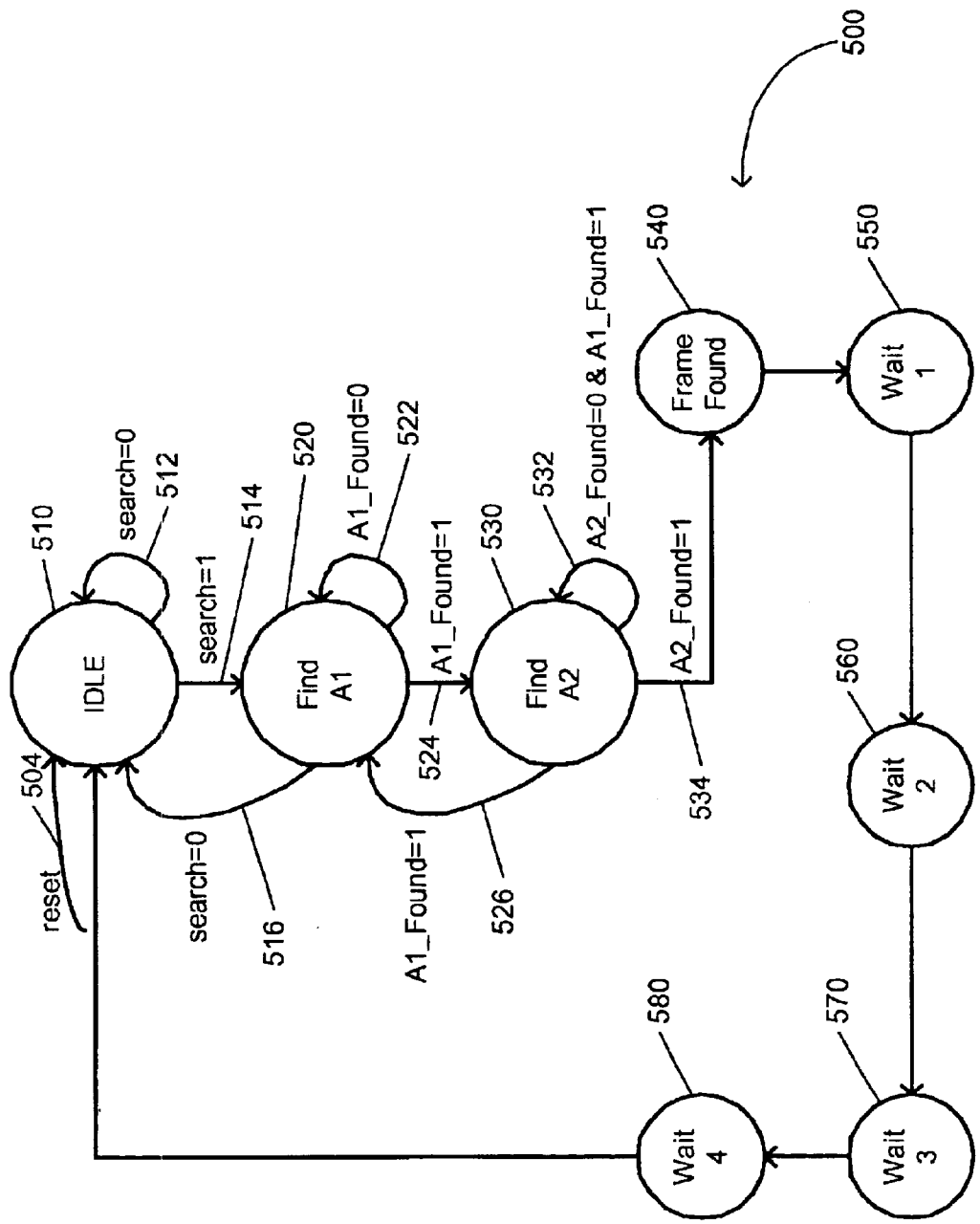
FIG. 5 illustrates a state machine diagram in accordance with an embodiment of the present invention.

Referring to FIG. 5, a state machine diagram 500 illustrates a method for framing an STS-N frame, such as an STS-192. The state machine focuses on finding a transition between a series of A1 bytes and A2 bytes. According to the embodiment, once a second byte position is found, the entire SONET frame can be derived. Accordingly, the state machine enables alignment of data as it passes downstream. In an embodiment, the framing pattern used for the state machine 500 is 56 bits in length for framing an STS-192. 56 is chosen because using a framing pattern with fewer bits increases the probability of false framing, i.e., finding the pattern elsewhere in the frame. If more bits are used, the circuit implementing the state machine becomes very expensive and the probability of not finding a frame due to bit errors increases.

More specifically, SONET systems transmit many more framing bytes than are required for framing. For each byte to be considered, a larger-than-required circuit would be implemented in the system. Conversely, if too few bytes are searched, the probability of false framing, i.e., framing bytes found in a non-framing section of data, increases.

According to an embodiment, the number of bits used to determine framing is a function of the probability of false framing. In one embodiment, the probability relates to an upper bound on the false framing probability. Given a single byte, the probability of false framing occurring in one byte time is determined according to the following formula:

Let n=number of bits in a byte. N=8. The probability p=1 out of $2^n$ or $1:2^8$ or 1:256.

The probability of finding 1 byte given two chances is $1/256+255/256^2$. The probability of finding 1 byte given three chances is given by: $1/256+255/256^2+255^2/256^3$ giving a repeating sequence. The probability of finding a given byte in t trials is given as:

$$\sum_{i=0}^{i=t-1} (256-1)^i / 256^{i+1}.$$

$(256-1)^i/256^{i+1}$. Because this equation is rather cumbersome for large trial counts, which is present in SONET, an upper bound on this equation is found by finding one byte in two trials: $1/256+255/256^2$, which is rewritten as: $1/256+(256/256^2-1/256^2)$, and $256/256^2$ is the same as 1/256. Recombining terms provides: $(1/256+1/256)-1/256^2$ or $2/256-1/256^2$.

Similarly, for one byte, given three trials, provides: $3/256-(1/256^2+1/256^3)$.

Thus, given t trials we say that the probability of finding 1 occurrence of a byte is bounded by: $t/256$. This only holds for t less than 256 as the probability cannot exceed 1.

We next apply the upper bound of $t/256$ to the frame search problem. First, a 32-bit frame search (e.g. A1-A1-A2-A2) is applied, which is typical for SONET framing for STS-N modules wherein N=48, 12 and 3.

The number of chances of observing the four bytes is provided as follows. First, given an STS-48, the total number of bits in a frame is 90 rows by 9 columns by 48 bytes is 90*9*48*8=311,040 bits. Given that the data travels serially, a framer in accordance with an embodiment must search through the 311,040 bits at 32 bits at a time. Thus, there are roughly 311,040 chances, and an upper bound probability on an STS-48 false framing utilizing 32-bits is as follows: $311,040/2^{32}=72.42\times10^{-6}$ or a one in 13,808 chance. Table 2, below, summarizes the upper bound probabilities for a 32-bit frame finder for different STS-N modules, wherein N=3, 12, 48 and 192.

TABLE 2

Probability of false framing given 32-bit frame search

| STS-N | Bits/Frame | Upper Probability | 1/p |
|---|---|---|---|
| STS-3 | 19,440 | $4.53 \times 10^{-6}$ | 220,934 |
| STS-12 | 77,760 | $18.10 \times 10^{-6}$ | 55,233 |
| STS-48 | 311,040 | $72.42 \times 10^{-6}$ | 13,808 |
| STS-192 | 1,244,160 | $289.7 \times 10^{-6}$ | 3,352 |

At OC-192 speeds (~10 Gbits/sec) it was determined that a one in 3,352 chances of false framing was too high. Thus, the number of framing bits in one embodiment are provided as 56 bits. Although 40 bits would have been adequate, the choice of 56 allows for future growth to STS-768 and beyond without having to re-address this issue. Accordingly, the probability of false framing on 56 bits with a STS-192 signal is provided by:

$1,244,160/2^{56}=17.27\times10^{-12}$, or a 1 in 57.92 billion chances.

Referring back to FIG. 5, the state machine 500 begins in an idle state 510. A search signal initiates the state machine 500, the search signal indicating that framing is needed. A search signal of 0 512 keeps the state machine idle, and a search signal of 1 514 transitions to the next state of the state machine state 520 Find A1. In one embodiment the search signal is generated and supplied to the state machine 500 by a controller implementing framing requirements for the SONET Specification that determine when a SONET incoming bit stream is not in frame.

The state machine remains at state 520 if an A1 byte is not found 522 at state A1_Found=0. At state 520, the state machine could receive a search=0 signal, causing the search machine to return to an idle state via 516. The Find A1 state 520 produces two signals, an unlock_byte_pos 590 and unlock_bit_pos 592. The unlock_byte_pos 590 and the unlock_bit_pos 592 represent signals that together indicate the framing state of the datapath. The unlocked bit positions represented by signals 590 and 592 are both locked when framing is complete. More specifically, at state Find A1 520, the unlock_byte_pos 590 is asserted and the unlock_bit_pos 592 is also asserted. The assertion of the 590 and 592 signals indicates that the incoming bitstream is not locked in frame. The 590 and 592 signals are output from both the Find A1 state 520 and the Find A2 state 530, as discussed below. The 590 and 592 signals are received by the circuit 600 shown in FIG. 6, further described below.

If an A1 byte is found, stage 524 A1_Found=1 directs the state machine to continue to stage 530 Find A2. Stage 530 directs a return to stage 520 via A1_Found=0 526, depending on the predetermined number of A1 bytes required by the method. For example, in an STS-192 embodiment, three A1 bytes are sufficient to frame the incoming bitstream. An STS-48 embodiment would require the same or fewer A1 bytes for framing. After the predetermined number of repetitions of the A1 byte are found, the bytes are bit aligned. More particularly, depending on the positions of the A1 bytes, a shift of 0 to 7 positions is required to align the data. In one embodiment, the bit aligning is based on 24 bits in a 128 bit datapath.

At stage 530, an A2 byte is searched. In an embodiment, the cycle began at stage 530 relates to a 16 byte datapath giving 16 possible byte positions. Accordingly, if an A2 byte is not found and the A1 bytes are found, the stage repeats itself via step 532 until an A2 byte is found. The signals unlock_bit_pos 592 and unlock_bit_pos 590 are output from state 530. Signal unlock_byte_pos is asserted at state 530 and signal unlock_bit_pos 590 is conditionally asserted at state 530 until an A2 byte is found. In one embodiment related to an STS-192 frame prioritizes the next four bytes. More specifically, 16 eight-bit comparators look for a constant A2 and provides results to a priority encoder. The priority encoder uses a log-base 2 encoding to output four bits indicating the highest number enabled comparator. Depending on the location of the A2 priority byte, the next three bytes to be checked are determined. In an embodiment, three boundary cases are first determined.

An indication that the A2 byte was found 534 directs the state machine to declare that the frame is found in stage 540.

In an embodiment, the indication that the A2 byte was found causes a word aligning of the bits based on the framing pattern. Once the frame is found, the state machine provides a Wait 1 550, Wait 2 560, Wait 3 570 and a Wait 4 580 before returning to an idle state 510, approximately 50 nanoseconds. The Wait states allow ample time for deasserting of search signals. One of ordinary skill in the art appreciates that additional nanoseconds are within the invention and that the amount of time is a function of number of cycles or states required to ensure that the system clears search signals.

Figure 6:
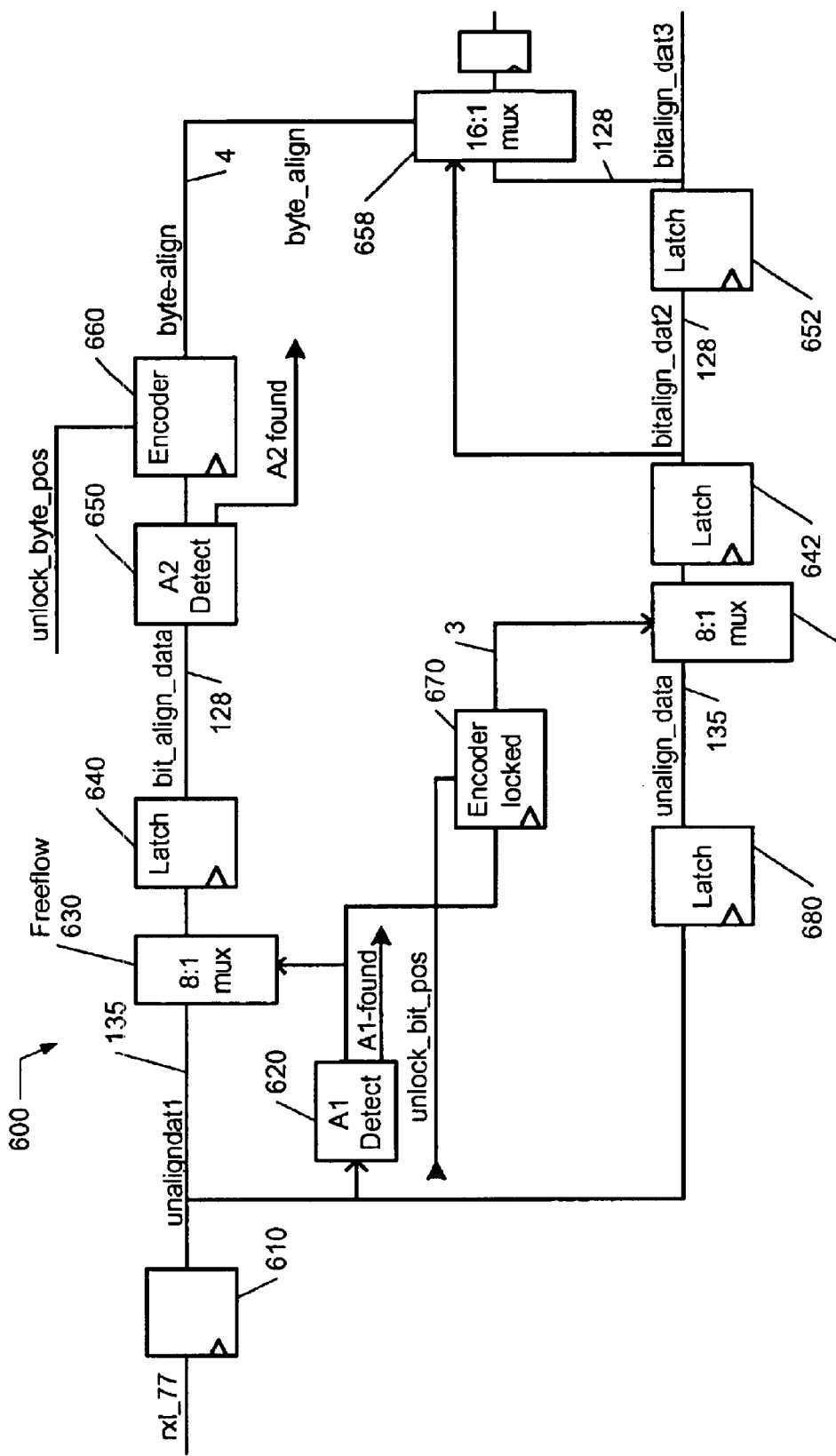
FIG. 6 illustrates a circuit in accordance with an embodiment of the present invention.
Figure 7:
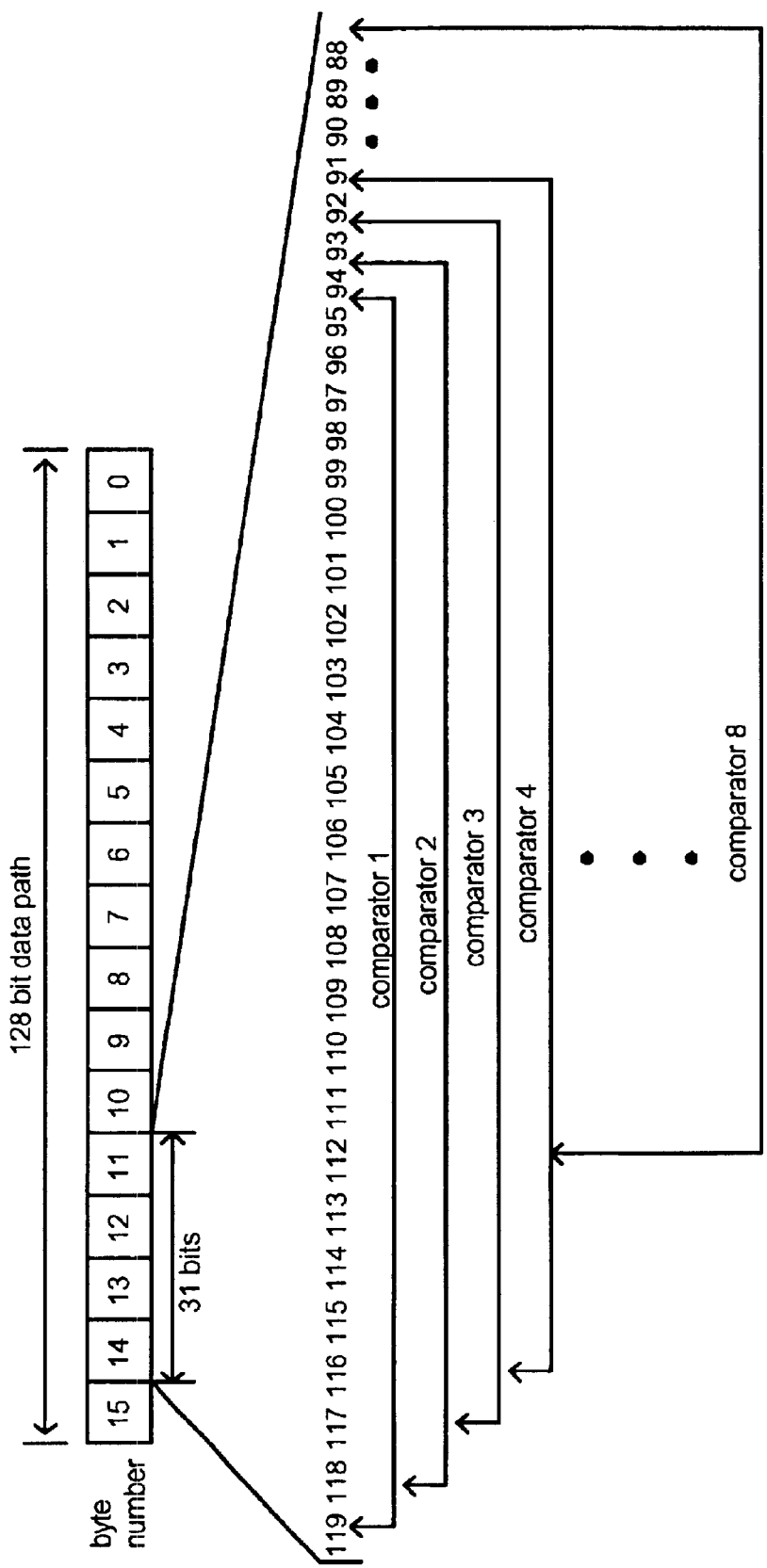
FIG. 7 illustrates a 128 bit datapath and comparator operations in accordance with an embodiment of the present invention.
Figure 8:
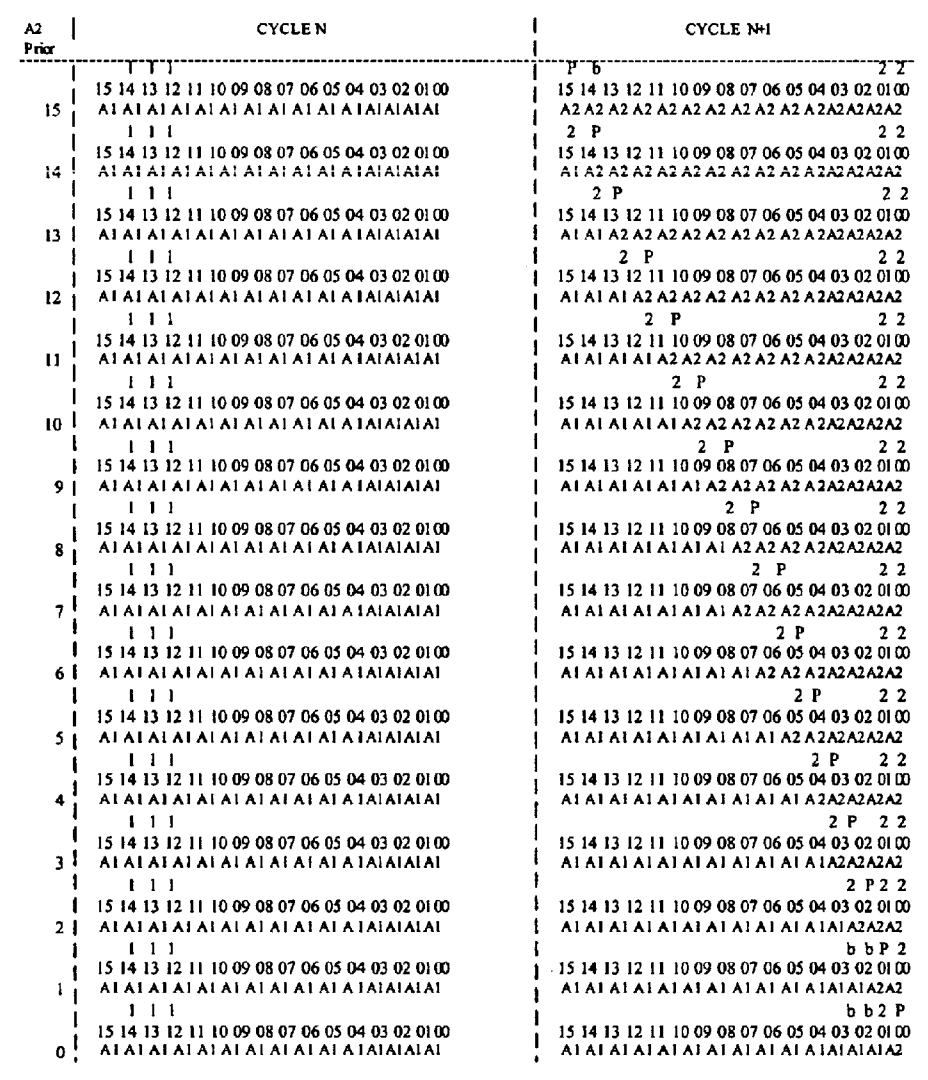

Referring now to FIG. 6, a block diagram of a circuit 600 in accordance with an embodiment of the invention is shown. FIG. 7 shows a bit diagram for a 128 bit datapath in accordance with an embodiment for framing an STS-192 datapath. Referring to FIG. 6 and FIG. 7 in combination, the circuit 600 includes a latch/register/pipe stage 610 for receiving unaligned data. In an embodiment, the unaligned data is in a 128-bit datapath, as shown in FIG. 7. FIG. 7 shows a first step for comparing bytes 11 through 14 of the received datapath. As shown, for each 31 bits, eight comparators are used to locate A1 bytes. More particularly, as shown in FIG. 8, the unaligned data is transmitted to an 8:1 multiplexer 630 that is a free flow multiplexer. The unaligned data is also transmitted to A1 detect 620 that performs the detection of the A1 bytes. The multiplexed data is transmitted to latch 640 that aligns the data. After latch 640 aligns the data, a 128 bit stream is transmitted to A2 detect circuit 650 which locates the A2 bytes. After the A2 bytes are detected, the data is transmitted to priority encoder 660 for again aligning the datapath, according to bytes. The aligned bytes are transmitted to multiplexer 658. Multiplexer 658 further receives data from the path beginning with the A1 detect circuit 620 and the latch 680 path. As in the path to multiplexer 630, latch 680 provides data to multiplexer 632, which is an 8:1 multiplexer. The data received at the A1 detect circuit 620 is transmitted to the multiplexer 630 as a control. Further, the data is received at encoder 670, which is in a locked state unless an unlock_bit command is received. The encoder produces three bits that are received at 8:1 multiplexer 632, along with a 135 bit unaligned datapath from latch 680. The multiplexer 642 then transmits data to latch 642, which transmits bit aligned data to both latch 652 and 16:1 multiplexer 658. Latch 652 transmits a 128 bit aligned datapath to 16:1 multiplexer 658. The output from 16:1 multiplexer 658 is both bit-aligned, byte-aligned and in frame.

Referring now to FIG. 8, tables showing the cycles N and cycles N+1 under different conditions are shown. More particularly, the tables shown describe an embodiment of a system and method for framing a bit stream as received by the circuit 600 shown in FIG. 6. The bits relate to an unaligned bit stream of 128 bits in length. In one embodiment, the 128 bits are formed by receiving a 16 bit input at 622 MHz, storing the 16 bit input into 8 registers to produce a 64 bit path at 155 MHz, and double buffering the 64 bits into a 128 bit stream at 77 MHz. As described above, the method according to an embodiment examines 56 bits of the unaligned bit stream to declare that the data is in frame, and 16 bits of the bit stream to keep the data in frame.

Referring to FIG. 8, as shown three columns represent the A2 priority byte, the cycle N and cycle N+1 steps of the method. Referring to A2 priority 15 row, the method includes searching a 24 bit section for three repetitions of A1, shown as 1, 1, 1 over bytes 14, 13 and 12 in cycle N. When three repetitions of A1 are found in cycle N, the A2 byte is priority encoded to the highest byte position, i.e., the 15$^{th}$ byte position being the highest in the embodiment in cycle N+1.

After the A2 byte is priority encoded, as shown in column cycle N+1 with the byte designated with a "P", four predetermined bytes are checked to determine whether the datapath is in frame. More particularly, the four bytes include the priority byte, which is known as an A2 byte, the A2 priority byte+1 to check for an A1 byte, the "0" byte to check for an A2 byte, and the "1" byte to check for an A2 byte. In boundary cases, the byte P−1 is checked for an A2 byte. Referring to FIG. 8, those bytes are designated in each row with a "2" for the 0 and 1 bytes, and a "b" above the boundary condition byte. Thus, according to the embodiment, there are 16 possible A2 byte locations for the cycle N+1 following a locating of three repetitions of the A1 byte.

Figure 9:
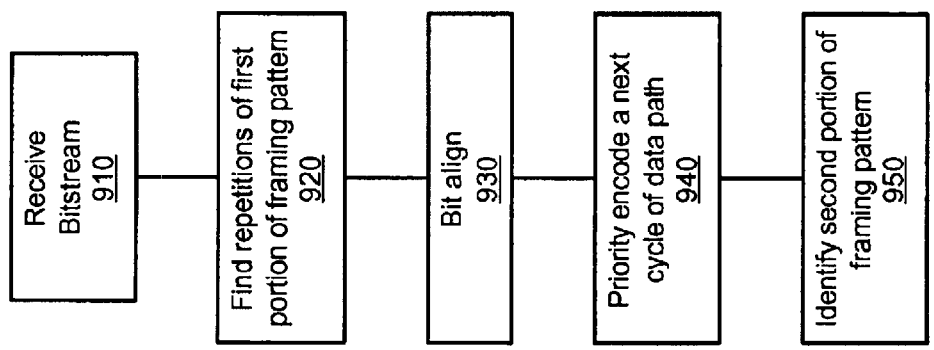
FIG. 9 is a flow diagram of a method in accordance with an embodiment of the present invention.

Referring to FIG. 9, a method 900 in accordance with an embodiment is shown in flow diagram. Specifically, method 900 includes block 910 receiving a bitstream, which is an unaligned bit stream requiring framing. Block 920 provides for locating a predetermined number of repetitions of a first portion of a framing pattern. For example, in an embodiment, three consecutive repetitions of the A1 byte are searched in a first cycle. Referring to FIG. 8, the bytes searched in an embodiment include the 12$^{th}$, 13$^{th}$ and 14$^{th}$ bytes (24 bits) of the datapath, although one of skill in the art appreciates that other consecutive bytes may be examined. However, the choice of bytes must take into account the possibility of bit errors for boundary cases. Block 930 provides for bit aligning the data based on the 24 bits found at block 920. The bit aligning includes shifting the datapath by zero to seven positions based on the byte positions of the found A1 bytes. The bit aligning prepares the data for a next cycle N+1 as shown in FIG. 8. The next cycle is identified by block 940 with priority encoding a next cycle of the datapath. More particularly, the priority encoding prioritizes the datapath with regard to the A2 bytes. With a 16 byte datapath, there are 16 possible byte positions for one or more A2 bytes. Accordingly, 16 eight-bit comparators searching for a constant A2 byte provides 16 results to a priority encoder. In an embodiment, the priority encoder outputs four bits indicating a highest numbered enabled comparator by performing a $\log_2$ operation on the results of the 16 comparators. The byte identified by the priority encoder identifies a location of an A2 priority byte.

Block 950 provides for identifying a second portion of the framing pattern. More particularly, the second portion of the framing pattern is found using the A2 priority byte located in the priority encoding. The next three bytes checked are determined with reference to the A2 priority byte. The next most significant byte away from the priority byte is checked for an A1 byte to determine whether the transition between A1 and A2 has been found. Additionally, the least significant byte and the penultimate least significant byte are checked to ensure that A2 bytes are found in accordance with the number of repetitions of A2 bytes expected under the SONET Specification. Finally, block 960 provides for the datapath to be word aligned after the 56 bit pattern. The word alignment is followed by declaring the datapath as framed. According to the SONET Specification, the framing pattern must be found two times to declare in frame and not found four times to declare the incoming bitstream as out of frame.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

What is claimed is:

1. A method for framing an incoming bit stream, the method comprising:
   receiving the incoming bit stream in a datapath;
   locating a predetermined framing pattern in the datapath, the locating including:
      finding a predetermined number of repetitions of a first portion of the framing pattern;
      bit aligning the bits in the datapath based on the predetermined number of repetitions of the first portion;
      priority encoding bits in a next cycle of the datapath;
      identifying a location of a second portion of the framing pattern; and
      word aligning the priority encoded bits; and
   declaring the bit stream as in frame.

2. The method of claim 1 wherein the incoming bit stream is over a datapath of at least 64 bits.

3. The method of claim 1 wherein the predetermined number of repetitions is at least three repetitions.

4. The method of claim 1 wherein the incoming bitstream is a parallelized bitstream, the parallelization being performed in a shift register.

5. The method of claim 1 wherein the method is performed in a communication circuit disposed in a synchronous optical network (SONET).

6. The method of claim 5, wherein the communication circuit is implemented as an application specific integrated circuit (ASIC).

7. The method of claim 5, wherein the communication circuit is implemented as an ASIC disposed in a management bay.

8. The method of claim 1 wherein the bit aligning is performed in a multiplexer.

9. The method of claim 1 wherein the priority encoding is performed via a plurality of comparators coupled to a multiplexer, the multiplexer outputting a byte location of an A2 byte, as defined in SONET specifications.

10. The method of claim 1 further comprising:
    parallelizing the incoming bitstream in a shift register.

11. The method of claim 1 wherein the incoming bitstream is a synchronous transport signal (STS) having N modules (STS-N).

12. The method of claim 11 where in N is 192.

13. An apparatus disposed in a communication system, the apparatus comprising:
    a shift register to receive an incoming bitstream, the shift register configured to parallelize the incoming bitstream;
    a bit-aligning multiplexer coupled to the shift register, the bit-aligning multiplexer bit-aligning the parallelized bitstream according to a first portion of a framing pattern;
    a priority encoder coupled to the bit-aligning multiplexer, the priority encoder locating a priority byte in the parallelized bitstream identified in a second portion of the framing pattern, the priority encoder identifying a transition between the first portion and the second portion of the framing pattern; and
    a byte-aligning multiplexer coupled to the priority encoder, the byte-aligning multiplexer byte-aligning the parallelized bitstream according to the priority byte, the byte-aligning determining frame borders of the incoming bitstream.

14. The apparatus of claim 13 wherein the bit-aligning multiplexer bit aligns three repetitions of the first portion of the framing pattern.

15. The apparatus of claim 13 wherein the priority encoder includes a plurality of comparators coupled to a multiplexer.

16. The apparatus of claim 15 wherein the plurality of comparators is eight.

17. The apparatus of claim 13 wherein the apparatus is disposed on an application specific integrated circuit (ASIC) coupled to a line card, the line card being one of a plurality of line cards disposed in a management bay holding one or more line cards configured to transmit a plurality of signals.

18. The apparatus of claim 13 wherein the communication system is a synchronous optical network (SONET).

19. The apparatus of claim 13 wherein the framing is for a synchronous transport signal (STS) having N modules (STS-N).

20. The apparatus of claim 19 wherein N is greater than 48.

21. The apparatus of claim 19 wherein N is 192.

22. A computer program product for communication, the computer program product comprising:
    signal bearing media bearing programming adapted to:
       locate a predetermined framing pattern with the bits in an incoming datapath;
       find a predetermined number of repetitions of a first portion of the framing pattern;
       bit align the bits in the datapath based on the predetermined number of repetitions of the first portion;
       priority encode bits in a next cycle of the datapath;
       identify a location of a second portion of the framing pattern;
       word align the priority encoded bits; and
       declare the aligned datapath as in frame.

23. The computer program product for communication of claim 22 wherein the predetermined number of repetitions is three.

24. A communication system comprising:
    means for locating a predetermined framing pattern with the bits in an incoming datapath, the means for locating including:
       means for finding a predetermined number of repetitions of a first portion of the framing pattern;
       means for bit aligning the bits in the datapath based on the predetermined number of repetitions of the first portion;
       means for priority encoding bits in a next cycle of the datapath;
       means for identifying a location of the second portion of the framing pattern; and
       means for word aligning the priority encoded bits; and
    means for declaring the bit stream as in frame.

25. The communication system of claim 24 wherein the predetermined number of repetitions is three.

26. The communication system of claim 24 wherein the communication circuit is disposed in a synchronous optical network (SONET).

27. The communication system of claim 24, wherein the bits in the incoming datapath are synchronous transport signals (STS) having N modules (STS-N).

28. The communication system of claim 27, wherein the STS-N signal is received as payload of a synchronous optical network (SONET) packet.

29. The communication system of claim 27, wherein the means for locating a predetermined framing pattern is implemented on an application specific integrated circuit (ASIC).

* * * * *